(12) United States Patent
Hu et al.

(10) Patent No.: US 9,937,565 B2
(45) Date of Patent: Apr. 10, 2018

(54) STUD FINDER AND LASER LEVEL ASSEMBLY FOR A POWER DRILL

(75) Inventors: Jiefan Hu, Hangzhou (CN); Xingjie Zhu, Providence, RI (US); Hengxing Yang, Jiangsu Province (CN); Xinhui Zhang, Hangzhou (CN)

(73) Assignee: Nanjing Chervon Co., Ltd., Nanjing (CN)

( * ) Notice: Subject to any disclaimer, the term of this patent is extended or adjusted under 35 U.S.C. 154(b) by 497 days.

(21) Appl. No.: 13/553,074

(22) Filed: Jul. 19, 2012

(65) Prior Publication Data

US 2013/0243538 A1 Sep. 19, 2013

(30) Foreign Application Priority Data

Mar. 15, 2012 (CN) .......................... 2012 1 0068860

(51) Int. Cl.
  *B23B 45/02* (2006.01)
  *B23B 49/00* (2006.01)
  *B25F 5/02* (2006.01)

(52) U.S. Cl.
  CPC .............. *B23B 49/00* (2013.01); *B23B 45/02* (2013.01); *B25F 5/021* (2013.01); *B25F 5/023* (2013.01); *Y10T 408/21* (2015.01)

(58) Field of Classification Search
  USPC ................. 408/2, 13, 16, 110, 112
  See application file for complete search history.

(56) References Cited

U.S. PATENT DOCUMENTS

| | | | |
|---|---|---|---|
| 4,099,118 A * | 7/1978 | Franklin et al. | ............. 324/671 |
| 5,148,108 A * | 9/1992 | Dufour | ........................ 324/226 |
| 6,334,743 B1 | 1/2002 | Liao | |
| D498,151 S | 11/2004 | Cook | |
| 6,851,487 B1 | 2/2005 | Shotey | |
| 6,937,336 B2 * | 8/2005 | Garcia et al. | ................. 356/399 |
| 7,059,057 B2 * | 6/2006 | Raskin et al. | .................. 33/286 |
| 7,148,703 B2 * | 12/2006 | Miller | .................... G01V 3/088 |
| | | | 324/662 |
| 7,217,069 B2 * | 5/2007 | Dils et al. | ..................... 408/124 |

(Continued)

FOREIGN PATENT DOCUMENTS

| | | |
|---|---|---|
| CN | 1597267 A | 3/2005 |
| CN | 2866019 Y | 2/2007 |

(Continued)

OTHER PUBLICATIONS

Chinese Search Report and Written Opinion corresponding to Chinese Application No. 201210068860.0 X (6 pages).

*Primary Examiner* — Alan Snyder
(74) *Attorney, Agent, or Firm* — Greenberg Traurig, LLP (57) ABSTRACT

A power tool includes a housing that encloses a motor, and a collet configured to be driven to rotate by the motor. The collet defines a drill axis about which the collet is configured to rotate. The power tool also includes a sensor assembly having a front wall with a wall contact surface. The front wall includes a first wall portion and a second wall portion that define a gap therebetween. An object sensor is secured to the front wall proximate the gap. A support member includes a first end portion attached to the front wall and a second end portion attached to the housing. The support member extends from the housing to position the front wall forwardly of the collet such that the drill axis intersects the gap.

8 Claims, 5 Drawing Sheets

(56) References Cited

U.S. PATENT DOCUMENTS

| | | |
|---|---|---|
| 7,331,113 B1 | 2/2008 | Patrick et al. |
| 7,385,390 B1 * | 6/2008 | Gasque, Jr. ............ G01V 3/081 324/207.2 |
| 7,523,558 B2 * | 4/2009 | Milligan et al. ................. 33/291 |
| 7,940,048 B2 * | 5/2011 | Skultety-Betz ............... 324/326 |
| 8,272,813 B1 | 9/2012 | Wise |
| 2003/0218469 A1 * | 11/2003 | Brazell et al. ................. 324/637 |
| 2010/0202846 A1 * | 8/2010 | Borunda ................... 408/241 G |

FOREIGN PATENT DOCUMENTS

| | | |
|---|---|---|
| CN | 201309144 Y | 9/2009 |
| DE | 102006061581 A1 | 7/2008 |
| EP | 1367365 B1 | 5/2009 |
| WO | WO 9852723 A1 * | 11/1998 |

\* cited by examiner

STUD FINDER AND LASER LEVEL ASSEMBLY FOR A POWER DRILL

CROSS REFERENCE TO RELATED APPLICATION

This application claims the benefit of Chinese Patent Application No. 20120068860.X, filed Mar. 15, 2012, the disclosure of which is hereby incorporated herein by reference in its entirety.

TECHNICAL FIELD

The present disclosure relates generally to power tools, such as drills, and particularly to accessories for use with drills, such as stud finders and laser levels.

BACKGROUND

Construction and home improvement projects often utilize structural members, such as studs or beams, hidden behind wallboards to provide structural support for mounting objects to a wall. Handheld location sensors, commonly referred to as stud finders, have been developed to accomplish this purpose. Typically, stud finders are used to locate a hidden beam or stud to serve as a mounting point for an object and the area is then marked with a pencil. Thereafter, a power tool, such as a drill, is used to drill a hole or drive a fastener through the wallboard into the hidden beam or stud at the marked location.

Many projects, such as hanging a shelf or hanging multiple picture frames, utilize a plurality of holes and/or fasteners that are aligned horizontally. These projects typically require that multiple framing studs to be located behind a wallboard. To perform these projects, a stud finder is used to locate the framing studs that are to be used to provide structural support. An alignment device, such as a laser level, is then typically used to provide a horizontal reference to facilitate a desired alignment. Using the horizontal reference, the framing studs are marked at appropriate locations. The power drill is then used to drill holes or drive fasteners into the studs at the marked locations. Because stud finders, laser levels, and power drills are typically provided as separate tools, an operator of these tools has to pick up and put down a different tool to perform each task.

Handheld tools that incorporate both a stud finder and a laser level are known. However, these tools still require an operator to use multiple tools to drill holes and/or drive fasteners in multiple studs that are aligned horizontally. A stud finder and laser level tool has been integrated onto a power tool. For example, U.S. Pat. No. 6,851,487 discloses location sensor and laser level device that is mounted onto a power tool, such as a drill or a nail gun. The location sensor and the laser level device in U.S. Pat. No. 6,851,487, however, require that the tool be repositioned or reoriented after locating a stud and finding the desired alignment to drive a fastener, such as a nail or screw, into the stud.

What is needed is a power drill having a stud finder and laser level that is integrated onto the tool that enables a series of horizontally aligned holes to be drilled into the structural members hidden behind a wallboard without having to pause to mark the area with a pencil, manipulate or reorient the tool in hand, and/or pick up a different tool.

SUMMARY

A power tool includes a housing that encloses a motor, and a collet configured to be driven to rotate by the motor. The collet defines a drill axis about which the collet is configured to rotate. The power tool also includes a sensor assembly having a front wall with a wall contact surface. The front wall includes a first wall portion and a second wall portion that define a gap therebetween. An object sensor is secured to the front wall proximate the gap. A support member includes a first end portion attached to the front wall and a second end portion attached to the housing. The support member extends from the housing to position the front wall forwardly of the collet such that the drill axis intersects the gap.

DETAILED DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Figure 1:
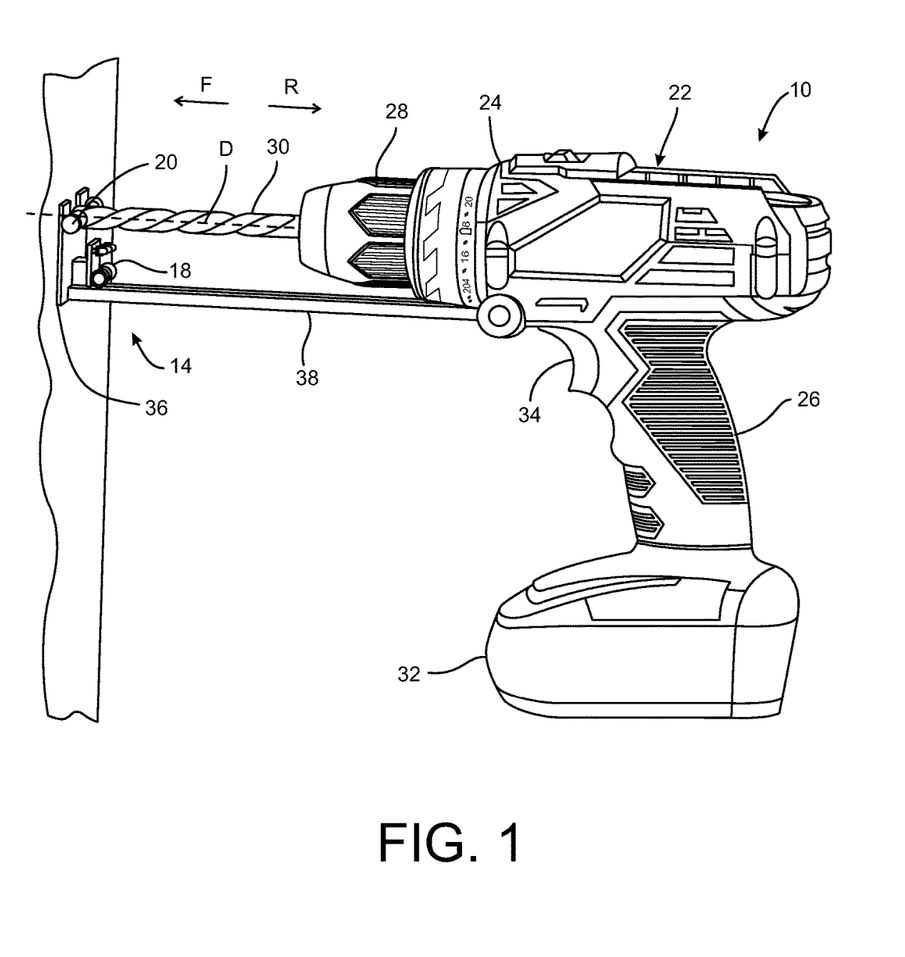
FIG. 1 is a perspective view of an embodiment of a power tool including a stud finder and laser level assembly in accordance with the present disclosure.
Figure 7:
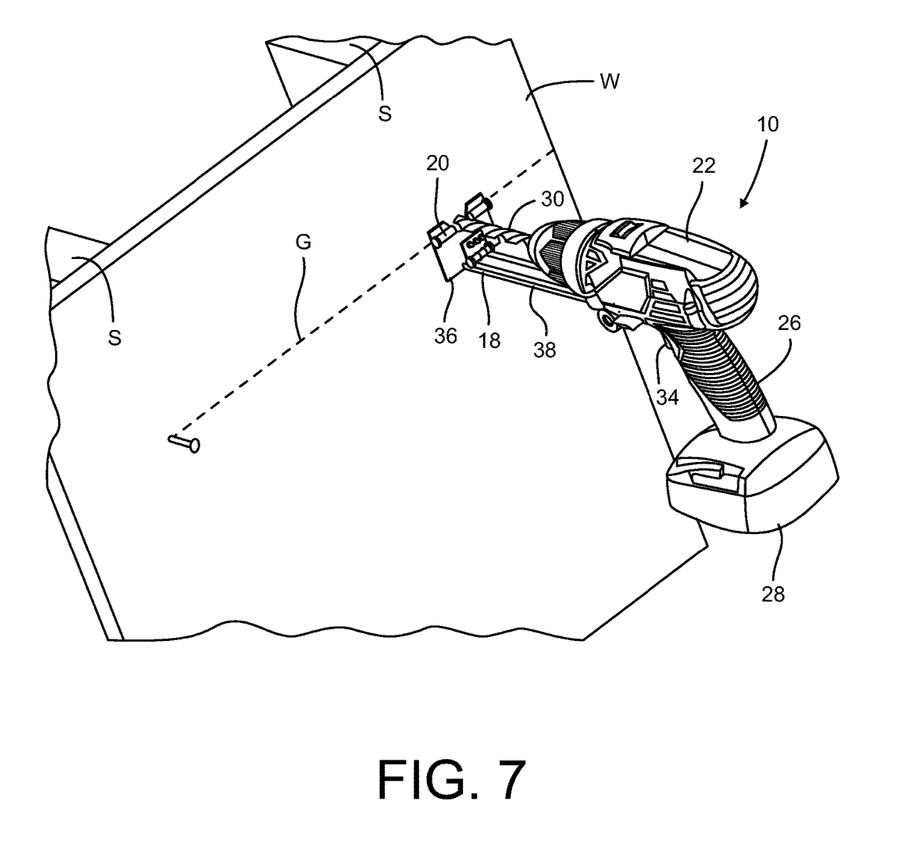
FIG. 7 is a perspective view of the power tool and stud finder and laser level assembly of FIG. 1 in operation.

FIG. 1 depicts a power drill 10 equipped with a stud finder and laser level assembly 14 in accordance with the present disclosure. As explained below, the stud finder and laser level assembly 14 includes an object sensor 18, i.e., a stud finder, for detecting hidden structural members, such as beams or studs located behind wallboards, and a laser level 20 for projecting laser lines onto the wallboards that enable drill holes and/or fasteners to be aligned horizontally with a separate reference point. The stud finder and laser level assembly 14 is attached to the power drill 10 in a manner that enables both the stud finder 18 and the laser level 20 to be used in conjunction with each other while the power drill is being held in an operative position in relation to a wallboard. As depicted in FIG. 7, the stud finder and laser level assembly 14 enables a series of horizontally aligned holes to be drilled into the structural members hidden behind a wallboard W without having to pause to mark the area with a pencil, manipulate or reorient the tool in hand, and/or pick up a different tool.

Referring to FIG. 1, the power drill 10 includes a housing 22 having a drive section 24 and a handle 26. The housing 22 is formed of a hard, durable material such as plastic, metal, or composite materials such as a fiber-reinforced polymer. The drive section 24 of the housing 22 encloses a motor (not shown) configured to rotate a collet 28 about a drill axis D. The collet 28 is configured to releasably retain various tool bits, including drill bits and driver bits, for rotation therewith about the drill axis D. The collet 28 is shown retaining a drill bit 30. The direction that the drill bit 30 extends from the collet is referred to herein as the forward direction F while the direction opposite the forward direction is referred to herein as the rearward direction R. In one embodiment, the motor (not shown) comprises an electric motor configured to receive power from a rechargeable battery 32 connected at the base of the handle 26. In other embodiments, electric power for the motor may be received from an AC outlet via a power cord (not shown). The handle 26 includes a trigger 34 configured to selectively connect the motor to the power source.

The stud finder and laser level assembly 14 comprises a main body 36 and a support member 38. The main body 36 provides a structure for supporting and retaining the object sensor 18 and laser level 20 devices. The support member 38 extends between the main body 36 and the drill housing 22 to attach the assembly 14 to the power tool 10. The support member 38 also serves to position the main body 36 of the assembly 14 in an area that is generally forward of the collet 28 and the tool bit 30 retained in the collet 28. The main body 36 and support member 38 are formed of a rigid material such as hard plastic or metal, and may be a made of a combination of different materials for different portions of the main body 36 and support member 38.

Figure 2A:
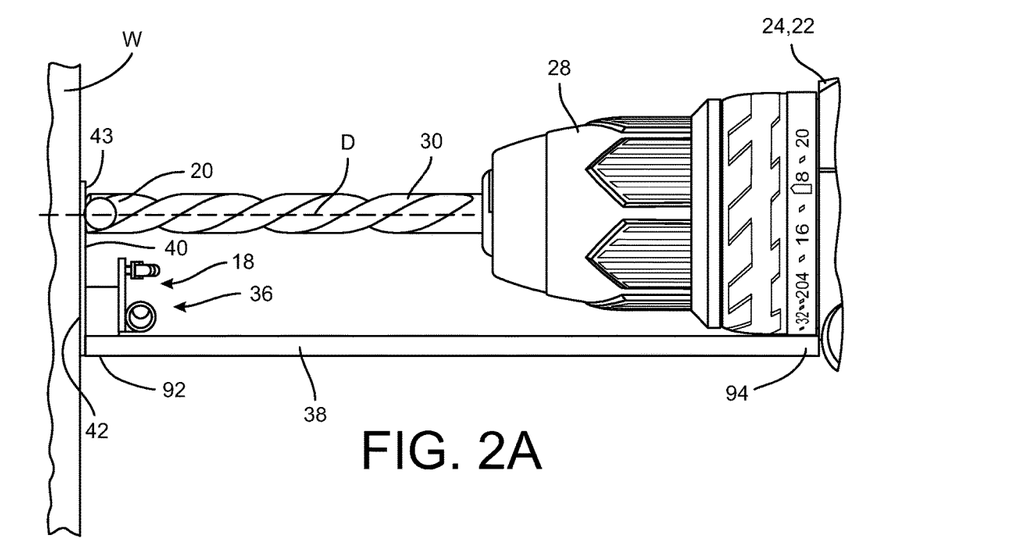
FIG. 2A is a partial fragmentary view of the power tool and stud finder and laser level assembly of FIG. 1.
Figure 2B:
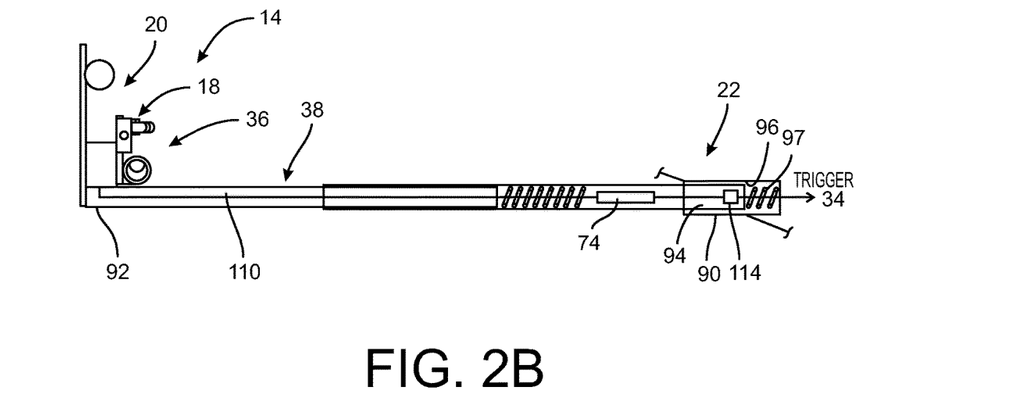
FIG. 2B is a schematic view of the power tool and stud finder and laser level assembly depicted in FIG. 2A.
Figure 3:
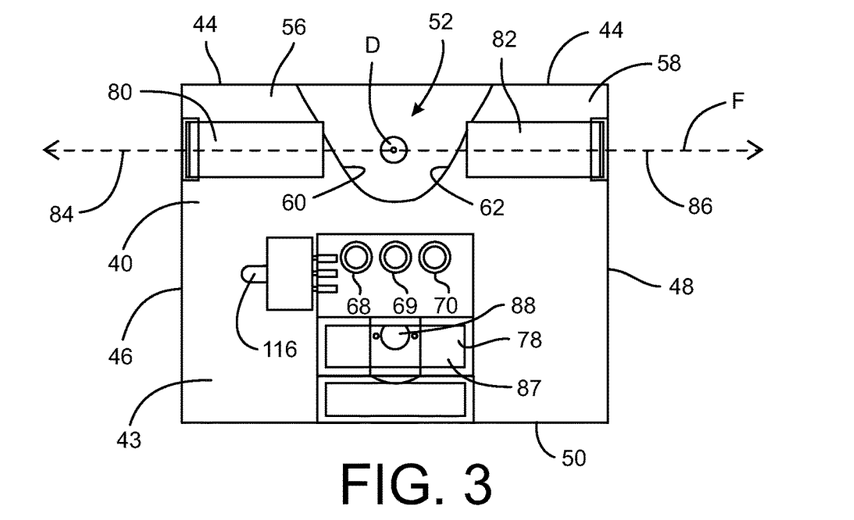
FIG. 3 is an elevation view of the main body of the stud finder and laser level assembly of FIG. 1.
Figure 4:
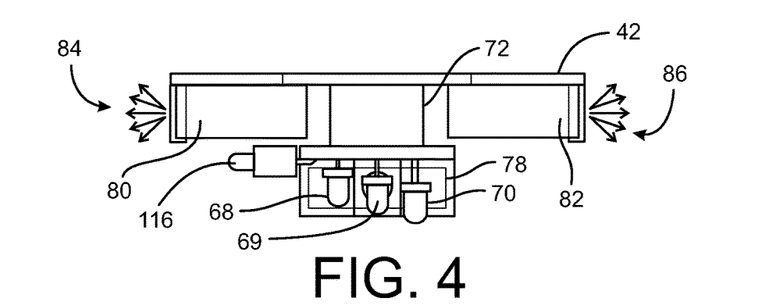
FIG. 4 is a top elevational view main body of the stud finder and laser level assembly of FIG. 3.
Figure 5:
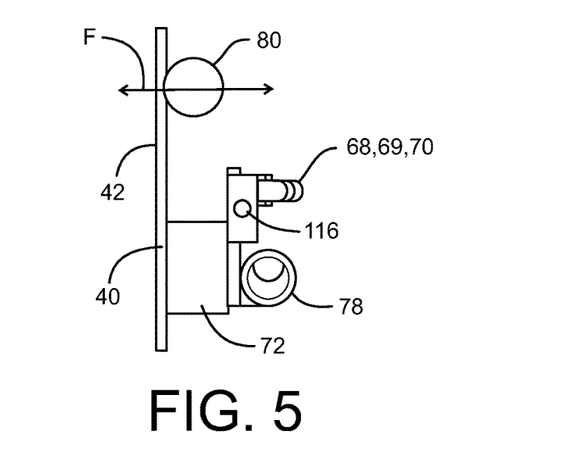
FIG. 5 is a side elevational view main body of the stud finder and laser level assembly of FIG. 3.

Referring to FIGS. 2-5, the main body 36 includes a front wall 40 having a forward facing surface 42 and a rearward facing surface 43. The forward facing surface 42 is configured to serve as the wall contact surface for the object sensor 18. The wall contact surface 42 is planar and smooth to enable the contact surface 42 to be moved along a wall surface when detecting studs and other structural members located behind the wall W. As depicted in FIG. 3, the front wall 40 is defined collectively by an upper edge portion 44, a left lateral edge portion 46, a right lateral edge portion 48, and a lower edge portion 50.

The upper edge portion 44 of the forward wall includes cutout section 52 that defines a generally V-shaped or U-shaped notch or gap extending from the upper edge portion 44 toward the lower edge portion 50 through both the forward facing and rearward facing surfaces 42, 43. The cutout section 52 is positioned along the upper edge portion 44 so that the gap is centered between the left lateral edge portion 46 and the right lateral edge portion 48.

When the stud finder and laser level assembly 14 is mounted on the drill 10, the front wall 40 is arranged with the wall contact surface 42 oriented generally perpendicular to the drill axis D. In addition, the front wall portion 40 is positioned in relation to the drill 10 so that the drill axis D intersects the gap 52. The front wall 40 includes a first wall portion 56 that is arranged on a first side of the gap 52, e.g., the left side, and a second wall portion 58 that is arranged on a second side of the gap 52, e.g., the right side. The first wall portion 56 includes a first gap edge 60, and the second wall portion includes a second gap edge 62. The first gap edge 60 and second gap edge 62 collectively define the shape of the gap 52.

Figure 6:
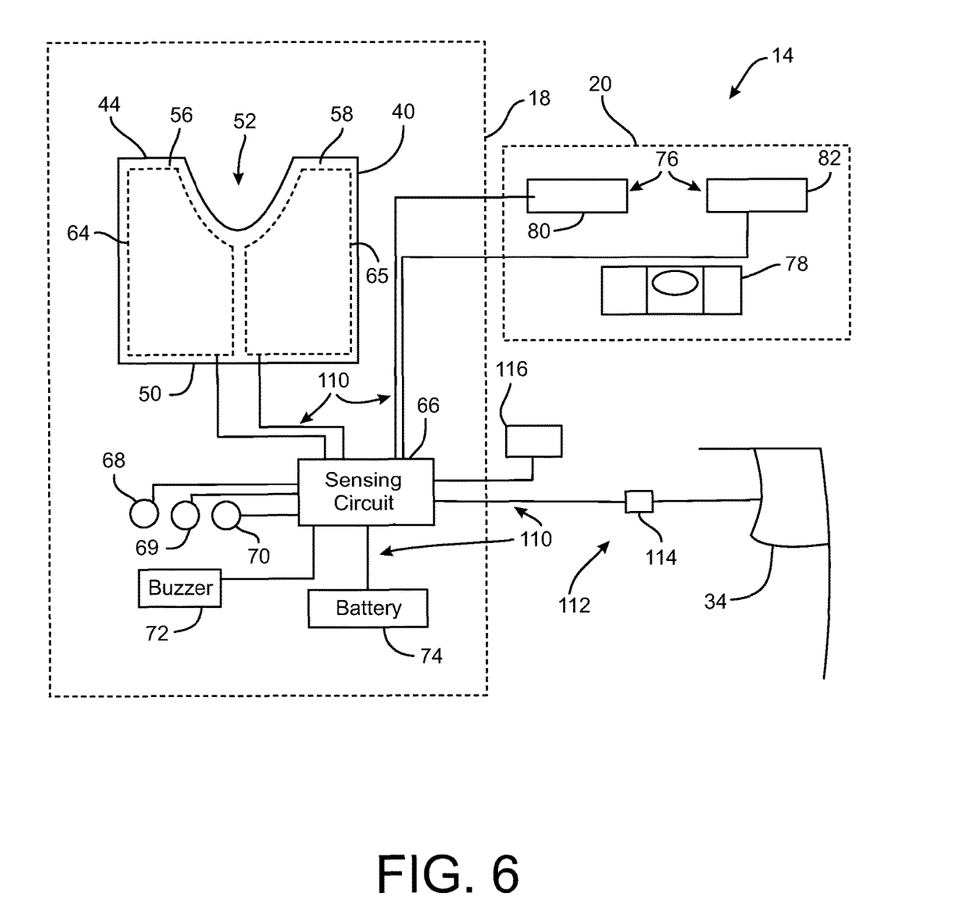
FIG. 6 is a schematic view of the stud finder and laser level assembly of FIG. 1.

Referring to FIG. 6, the object sensor 18 comprises one or more capacitor plates 64, 65 electrically coupled to a sensing circuit 66. Each capacitor plate 64, 65 is located within the front wall 40 adjacent to and behind the wall contact surface 42. The sensing circuit 66 is configured to detect changes in the capacitive charge in the capacitor plates 64, 65 that are indicative of changes in the dielectric constant of the material in front of the capacitor plates. As is known in the art, a significant change in the dielectric constant indicates a dense object behind the wall, such as a framing stud. Although two capacitor plates 64, 65 are shown, in alternative embodiments, a single capacitor plate or more than two capacitor plates may be used for locating objects within or behind the wall as is known in the art.

As depicted schematically in FIG. 6, the object sensor 18 includes a first capacitor plate 64 that extends between the upper edge portion 44 and lower edge portion 50 of the front wall 44 near the left lateral edge portion 46. The object sensor 18 also includes a second capacitor plate 65 that extends between the upper edge portion 44 and lower edge portion 50 of the front wall 44 near the right lateral edge portion 48. Thus, at least a portion of each of the first and second capacitor plates 64, 65 is positioned to the left and right, respectively, of the gap 52. As a result, when the stud finder and laser level assembly 14 is mounted on the drill in an operative position, the drill axis D extends through the gap between the first capacitor plate 64 and the second capacitor plate 65.

The object sensor 18 includes one or more indicator device(s) for providing visual and/or audio indications of when a dense object, such as a framing stud, is located in front of a capacitor plate. In the embodiment of FIGS. 1-5, the object sensor 18 includes visual indicators 68, 69, 70 in the form of light-emitting diodes (LEDs). The object sensor also includes an audio indicator 72 in the form of a buzzer. The sensing circuitry 66 is configured to selectively activate the LEDs 68, 69, 70, and the buzzer 72 based on the capacitive charge of the capacitor plates 64, 65 in order to provide an indication of whether a framing stud or other structural member is located behind the wall in front of the object sensor 18.

The laser level 20 of the assembly 14 comprises a laser line generator 76 and a level indicator 78. The laser line generator 76 includes a first laser line generator 80 and a second laser line generator 82. The first laser line generator 80 is attached to the first wall portion 56 of the front wall 40, and the second laser line generator 82 is attached to the second wall portion 58 of the front wall 40. Each of the first and second line generators 80, 82 includes a light source, such as one or more LEDs, that transmits light through a lens that is configured to emit the light in a planar configuration. The lens is configured to direct and shape the light so that the light plane is oriented generally perpendicularly relative to the wall contact surface 42. As a result, the light plane generated by each line generator intersects the wall to create an illuminated laser line G as depicted in FIG. 7. The light emitted by the first and second line generators 80, 82 defines a light plane F that is perpendicular to the wall contact surface 42. The light plane F intersects the gap 52 and intersects any surface located in front of the wall contact surface 42 to form a straight illuminated line.

Referring to FIG. 3, the first laser line generator 80 is configured to project a first portion 84 of the light plane F, and the second laser line generator 82 is configured to project a second portion 86 of the light plane F. The first line generator 80 and the second line generator 82 are configured to generate the first and second portions 84, 86 of the light plane F such that they are substantially co-planar in order to project a straight line G that extends laterally from each side of the main body 36 of the assembly 14 as depicted in FIG. 7.

The first and second laser line generators 80, 82 are attached to the first and second wall portions 56, 58 of the front wall 40, respectively, so that the line generators 80, 82 are positioned on opposite sides of the gap 52. The drill axis D therefore extends through the gap 52 between the first and second line generators 80, 82. The line generators 80, 82 are positioned in relation to the gap 52 and to each other so that the drill axis D resides substantially in the light plane F.

The level indicator 78 of the laser level 20 (FIG. 6) is configured to provide an indication of the angular orientation of the laser line generated by the laser line generators 80, 82. In one embodiment, the level indicator 78 comprises a bubble level. The bubble level includes a transparent tube or vial 87 that is filled with a liquid, such as alcohol, and that has an air bubble 88 trapped inside. As the orientation of the tube 87 changes, the position of the bubble 88 shifts toward one of the tube or the other. The first and second line generators 80, 82 are calibrated to the levels indicated by the bubble level 78 so that the laser lines 84, 86 generated by these devices are horizontal when the bubble level 78 indicates a horizontal orientation.

Referring now to FIGS. 2A and 2B, the support member 38 attaches the main body 36 to the drill housing 22. The support member includes a first end portion 92 that is attached to the main body 36 and a second end portion 94, or housing end portion, that is attached to the drill housing 22. The drill housing 22 includes an attachment member 90 that defines a receptacle 96 for receiving the housing end portion 94 of the support member 38. The attachment member 90 and the housing end portion 94 are configured to cooperate to removably retain the housing end portion 94 in the receptacle.

In one embodiment, the housing end portion 94 of the support member 38 is secured to the attachment member 90 by a spring-loaded retaining mechanism 97 although any suitable mechanism may be used to releasably attached to the support member 38 to the housing 22. In addition, in some embodiments, the support member 38 has a telescoping configuration that enables the main body 38 of the assembly 14 to collapse and expand axially. This configuration enables the main body 36 of the stud finder and laser level assembly 14 to remain in place against the surface of a wall as the drill 10 is moved forwardly to drive a drill bit or fastener into the wall. Alternatively or in addition to the telescoping configuration, the support member 38 and the attachment member 90 of the drill 10 may be configured to allow object sensor and laser level assembly 14 to be pivoted downwardly away from the collet 28 and drill bit 30.

Referring to FIG. 6, in one embodiment, the circuitry 110 for the stud finder and laser level assembly 14 is at least partially incorporated into the support member 38. The circuitry 110 electrically couples the object sensor 18 and laser level 20 to an electrical power source. In one embodiment, the power source for the assembly 14 is provided by a battery 74 that is located in the support member 38. Alternatively, the stud finder and laser level assembly 14 may be configured to receive power from the power drill when the assembly 14 is attached to the power drill 10. The stud finder and laser level assembly 14 includes an activation switch 112 that enables the stud finder 18 and laser level 20 devices to be selectively activated when needed.

In one embodiment, the activation switch 112 includes electrodes 114 that are arranged on the housing end portion 94 of the support member 38. When the housing end portion 94 of the support member 38 is retained in the receptacle 96 of the attachment member 90, the electrodes 114 are operably coupled to the trigger 34 of the power drill. Power to the stud finder and laser level is then controlled based on the position of the trigger 34. In one embodiment, when the trigger 34 is depressed approximately half way, the electrodes 114 are electrically or mechanically coupled to close the power circuit so that power is provided to the stud finder and laser level devices. When the trigger 34 is released, the electrodes 114 are uncoupled to open the power circuit and deprive the stud finder and laser level assembly 14 of power.

The stud finder and laser assembly 14 is also configured to be operated when it is separated from the power drill. The stud finder and laser assembly 14 includes a power switch 116 for turning on and turning off power to the stud finder and laser level assembly 14 when the assembly is operated separately from the power drill. The power switch 116 is configured to couple power from the battery 74 to the stud finder and laser level assembly 14. In one embodiment, the power switch 116 is provided on the main body 36 near the indicator LEDs although the power switch 116 may be provided at other locations on the main body 36.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:
1. A power tool comprising;
   a housing that encloses a motor;
   a first power supply mounted to the housing and electrically coupleable to the motor to provide operating power to the motor;
   an attachment member mounted to the housing, the attachment member defining a receptacle;
   a collet configured to be driven to rotate by the motor, the collet defining a drill axis about which the collet is configured to rotate; and
   a sensor assembly comprising:
     a front wall having a wall contact surface, the front wall including a first wall portion and a second wall portion that define a gap therebetween;
     an object sensor secured to the front wall proximate the gap;
     a laser level attached to the front wall;
     a support member including a first end portion attached to the front wall and a second end portion removably attached to the receptacle, the support member extending from the housing to position the front wall forwardly of the collet such that the drill axis intersects the gap;
     a second power supply mounted to the support member, wherein the second power supply is configurable to provide operating power to the object sensor and the laser level, and the first power supply is configurable to provide power to the object sensor and the laser level when the sensor assembly is attached to the receptacle,
     wherein the object sensor comprises a capacitive sensor with a first capacitor plate portion located in the first wall portion and a second capacitor plate portion located in the second wall portion such that the drill axis and at least a portion of the gap is located between the first capacitor plate portion and the second capacitor plate portion.
2. The power tool of claim 1, wherein the laser level includes a first laser line generator and a second laser line generator, wherein the first laser line generator is mounted to the first wall portion and the second laser line generator is mounted to the second wall portion, and wherein the first laser line generator and the second laser line generator define a light plane that intersects the gap.

3. The power tool of claim 2, wherein the drill axis resides in the light plane.

4. The power tool of claim 2, wherein the drill axis extends between the first line generator and the second line generator.

5. The power tool of claim 2, wherein the laser level further includes a bubble level.

6. The power tool of claim 1, wherein the second power supply is a battery installed in the support member for providing power to the object sensor and the laser level.

7. The power tool of claim 1, further comprising:
a tool bit releasably retained in the collet.

8. The power tool of claim 1, wherein the support member is pivotably attached to the housing.

* * * * *